(12) United States Patent
Peng

(10) Patent No.: US 11,923,513 B2
(45) Date of Patent: *Mar. 5, 2024

(54) ULTRASONIC SOLID-STATE LITHIUM BATTERY WITH BUILT-IN ULTRASONIC VIBRATING EFFECT

(71) Applicant: Zhijun Peng, Guangdong (CN)

(72) Inventor: Zhijun Peng, Guangdong (CN)

(*) Notice: Subject to any disclaimer, the term of this patent is extended or adjusted under 35 U.S.C. 154(b) by 249 days.

This patent is subject to a terminal disclaimer.

(21) Appl. No.: 17/535,689

(22) Filed: Nov. 26, 2021

(65) Prior Publication Data

US 2022/0246997 A1   Aug. 4, 2022

(30) Foreign Application Priority Data

Feb. 3, 2021   (CN) .......................... 202110150922.0

(51) Int. Cl.
*H01M 10/42* (2006.01)
*H01M 10/0525* (2010.01)

(52) U.S. Cl.
CPC ... *H01M 10/4214* (2013.01); *H01M 10/0525* (2013.01); *H01M 10/4235* (2013.01); *H01M 10/4242* (2013.01); *H01M 2300/0065* (2013.01)

(58) Field of Classification Search
None
See application file for complete search history.

(56) References Cited

U.S. PATENT DOCUMENTS

| 5,378,551 A | * | 1/1995 | Meadows | H01M 50/497 |
| | | | | 429/129 |
| 2020/0020990 A1 | * | 1/2020 | Oba | H01M 10/42 |
| 2022/0399588 A1 | * | 12/2022 | Khokhlov | H01M 4/244 |

FOREIGN PATENT DOCUMENTS

JP   06084544 A  *  3/1994  ........ H01M 10/4214

* cited by examiner

*Primary Examiner* — Robert S Carrico

(57) ABSTRACT

An ultrasonic solid-state lithium battery with built-in ultrasonic vibrating effect, including a battery case; and a positive electrode, a negative electrode and solid electrolyte installed on the battery case. A built-in ultrasonic vibrating module is provided within the positive electrode and/or negative electrode and/or solid electrolyte. The ultrasonic vibrating module has an ultrasonic vibrating element and an insulating layer covering the peripheral surfaces of the ultrasonic vibrating element. Wiring terminals electrically connected with the ultrasonic vibrating element are provided on or above a top end of the positive electrode and/or negative electrode and/or solid electrolyte.

3 Claims, 8 Drawing Sheets

ULTRASONIC SOLID-STATE LITHIUM BATTERY WITH BUILT-IN ULTRASONIC VIBRATING EFFECT

BACKGROUND OF THE INVENTION

The present invention relates to storage batteries and more particularly pertains to a storage battery with ultrasonic cavitation effect.

Lead acid battery is a kind of storage battery in which the electrodes are made from lead and its oxides, and the electrolyte is sulfuric acid. When the lead acid battery is discharging, the positive electrode is mainly composed of lead dioxide, the negative electrode is mainly composed of lead. When the lead acid battery is charging, the positive and negative electrodes are mainly composed of lead sulfate. When the lead acid battery in the present art is used for a period of time, lead sulfate crystals will attach to the surface of the electrode plates. The increasing amount of the lead sulfate crystals will constitute an obstacle to the contact between the electrode plates and the electrolyte, thus affects the storage performance and charge-discharge performance of the lead acid battery. Eventually, the lead acid battery will lose the charge-and-discharge ability before the electrode plates being completely consumed.

In view of the aforesaid disadvantages now present in the prior art, the Applicant filed a patent application under the title "An ultrasonic lead acid battery" with the China National Intellectual Property Administration (CN110931891A; Patent application no.: 201811098611.9) on 20 Sep. 2018. The solution disclosed in said Chinese patent application comprises a battery case, a battery lid, a cluster, an ultrasonic energy converter, vibrating bars, etc. The ultrasonic energy converter is installed on the top of the battery. The vibrating bars are inserted into the gaps between a positive plate and a separator and between a negative plate and a separator. The ultrasonic energy convertor will drive the vibrating bars to vibrate in ultrasound in high frequency to prevent lead sulfate crystals from forming on the electrode plates. This maintains a sufficient and complete contact between the electrode plates and the electrolyte, and hence slows down the decline of the storage performance of the storage battery as well as extends the usage life of the storage battery. Yet, despite the advantages, the technical solution is still not the best solution as it makes the battery more complicated and larger in size.

The lithium battery is mainly composed of a positive electrode (LiMn2O4 materials), a negative electrode (graphite materials), electrolyte and a separator. When a power supply is charging the battery, electrons on the positive electrode move to the negative electrode through an external circuit; lithium ions enter the electrolyte, move through the curvy holes on the separator and swim to the negative electrode, combining with the electrons arrived earlier at the negative electrode. When the battery is discharging, electrons on the negative electrode move to the positive electrode through the external circuit; lithium ions enter the electrolyte, move through the curvy holes on the separator and swim to the positive electrode, combining with the electrons arrived earlier at the positive electrode. Lithium ions depart from the positive electrode and arrive at the negative electrode after passing through the electrolyte. After the battery charges and discharges for the first time, a passivation layer of solid electrolyte, namely solid electrolyte interface (SEI), will be formed between the electrodes and the liquid electrolyte. SEI has a dual role of being an insulator of electrons and a good conductor of lithium ions. This layer protects the battery by preventing harmful reactions from occurring and allows lithium ions to travel between electrodes and the electrolyte. SEI is the key element for the performance of lithium battery. If the performance of SEI is unsatisfactory, many problems will be found. When SEI is decaying, loads of problems will arise, such as deposition inhomogeneity on the lithium electrodes, resulting in crystal formation, after multiple times of charging and discharging. These lithium metal crystals will constitute an obstacle to the movement of lithium ions, leading to a loss of battery capacity, lower charge-discharge efficiency, or, due to continuous crystal formation, the crystals may pierce through the separator, causing short circuit of the electrodes and eventually spark a fire. The working temperature for lithium battery is 0-40° C. When the ambient temperature is lower than 0° C., the pores (so-called "tiny holes") on the separator will shrink due to thermal contraction, making it more difficult or even impossible for lithium ions to pass through the separator. Lithium ions will also be easily frozen in the electrolyte and their movement becomes slower, which makes the lithium battery unable to charge and discharge as usual, undermining the overall performance of the lithium battery. Therefore, this is also a technical issue that needs to be resolved, on how to maintain normal charging and discharging of lithium battery in a cold environment.

In view of the aforesaid disadvantages now present in the prior art, the Applicant filed a patent application under the title "An ultrasonic smart temperature-increasing and anti-crystallization lithium battery" with the China National Intellectual Property Administration (CN111755759A; Patent application no.: 201910235529.4) on 27 Mar. 2019. The solution disclosed in said Chinese patent application comprises a lithium battery, ultrasonic energy converters, a temperature sensor, a circuit board control module, an ultrasound generator, a metallic case, etc. The ultrasonic energy converters are provided on the metallic case of the lithium battery; the cavitation effect produced by the ultrasonic energy converters reduces or slows down the formation of lithium metal crystals in the lithium battery, prevents the separator from being blocked or pierced through by the crystals and hence extends the usage life of the lithium battery. In cold environment, the ultrasonic cavitation effect also facilitates the speed of movement of lithium ions in the lithium battery, increases the internal temperature and hence solves the problem of charging and discharging in cold environment. Although this solution, to a large extent, solves the problem of charging and discharging in cold environment comparing to the lithium batteries in the prior art, it makes the battery more complicated and larger in size. Producing ultrasound externally is also inefficient. Therefore, this is still not the best solution.

BRIEF SUMMARY OF THE INVENTION

In view of the aforesaid disadvantages now present in the prior art, the present invention provides an ultrasonic solid-state lithium battery with built-in ultrasonic vibrating effect, in which an ultrasonic vibrating element is provided within the positive electrode and/or negative electrode and/or solid electrolyte. The ultrasonic vibrating element will directly act on the positive electrode and/or the negative electrode and/or the solid electrolyte, to facilitate the movement of molecules in the positive electrode and/or the negative electrode and/or the solid electrolyte. This removes the crystals attached to the positive electrode and/or negative electrode and/or solid electrolyte, and prevents formation the passivation layer on the surface of the positive electrode and/or the negative electrode and/or the solid electrolyte. This is to avoid chemical reactions between the solid electrolyte and the positive electrode or the negative electrode, so as to extend the usage life of the solid-state lithium battery. Furthermore, the ultrasonic vibrating element causes a quick movement of the molecules and hence speeds up the electron movement in the current and enhances the efficiency of charging and discharging. Quicker and smoother electron movement also prevents the battery from inflation and explosion, and helps increase the temperature of the battery in cold environment, hence solves the problem of low charge-and-discharge efficiency and inability to function normally in winter. The solution greatly reduces the structural complexity of the ultrasonic battery so that it may be developed in a lighter and more modularized way.

To attain this, the present invention adopts the following technical solutions:

An ultrasonic solid-state lithium battery with built-in ultrasonic vibrating effect, comprising a battery case; and a positive electrode, a negative electrode and solid electrolyte installed on the battery case. It is characterized in that it comprises an ultrasonic vibrating module built-in within the positive electrode and/or the negative electrode and/or the solid electrolyte. The ultrasonic vibrating module comprises an ultrasonic vibrating element and an insulating layer covering peripheral surfaces of the ultrasonic vibrating element. Wiring terminals electrically connected with the ultrasonic vibrating element are provided on or above a top end of the positive electrode and/or the negative electrode and/or the solid electrolyte.

Preferably, the ultrasonic vibrating element is an ultrasonic energy converter of 1 MHz or above.

Preferably, the ultrasonic vibrating element is an ultrasonic vibrating motor with a rotational speed of 10,000 rpm or above.

The advantages of the present invention are: (1) The ultrasonic vibrating element is provided within the positive electrode and/or the negative electrode and/or the solid electrolyte. When the ultrasonic vibrating element is functioning, it will directly act on the positive electrode and/or the negative electrode and/or the solid electrolyte, to facilitate the movement of molecules in the positive electrode and/or the negative electrode and/or the solid electrolyte. This removes the crystals attached to the positive electrode and/or the negative electrode and/or the solid electrolyte, and prevents formation of passivation layer on the surface of the positive electrode and/or the negative electrode and/or the solid electrolyte. This is to avoid chemical reactions between the solid electrolyte and the positive electrode or the negative electrode, so to extend the usage life of the solid-state lithium battery.

(2) Formation of passivation layer on the surface of the positive electrode and/or the negative electrode and/or the solid electrolyte is due to the chemical reactions between the positive electrode and the solid electrolyte and between the negative electrode and the solid electrolyte during charging and discharging. The chemical reaction first takes place on the surface of substances and creates useless decomposed substances every time when the chemical reaction takes place. The decomposed substances will attach to the surface of the positive electrode and/or the negative electrode and/or the solid electrolyte and affect their mutual chemical reaction, eventually undermine the charge-and-discharge performance, storage performance and the usage life of the solid-state lithium battery. This explains why the solid-state lithium batteries have a limited number of times of charging and discharging. Yet, the present invention adds the ultrasonic vibrating element within the positive electrode and/or the negative electrode and/or the solid electrolyte. Through the cavitation effect produced by the ultrasound, the internal molecules move rapidly and collide with each other, so that the decomposed substances will detach. The surface which has not been decomposed and has not undergone any chemical reaction will be exposed once again, so that during charging and discharging, the electrons will be in contact with the surface and be involved in the chemical reaction, hence maintaining the battery performance.

(3) The ultrasonic vibrating element causes the molecules to move rapidly and hence speeds up the electron movement in the current and enhances the efficiency of charging and discharging. Quicker and smoother electron movement also prevents the battery from inflation, explosion and passivation, and helps increase the temperature of the battery in cold environment, hence solves the problem of low charge-and-discharge efficiency and inability to function normally in winter. The solution greatly reduces the structural complexity of the ultrasonic battery so that it may be developed in a lighter and more modularized way.

(4) The present invention has a high charge-and-discharge efficiency, a high resistance of low temperature, a good performance and a long usage life. It is also safe to use as it is anti-inflation and anti-explosion. Its structure is simple and easy for manufacturing, hence is able to be developed in an industrialized way. Comparing with the batteries of the prior art, the present invention solves the problem occurring in non-ultrasonic batteries, such as crystallization, crystals piercing through separator, inflation, passivation, leakage of electrolyte, explosion, slow charging and discharging, low resistance to coldness, unsatisfactory performance, etc.

DETAILED DESCRIPTION OF THE INVENTION

Figure 1:
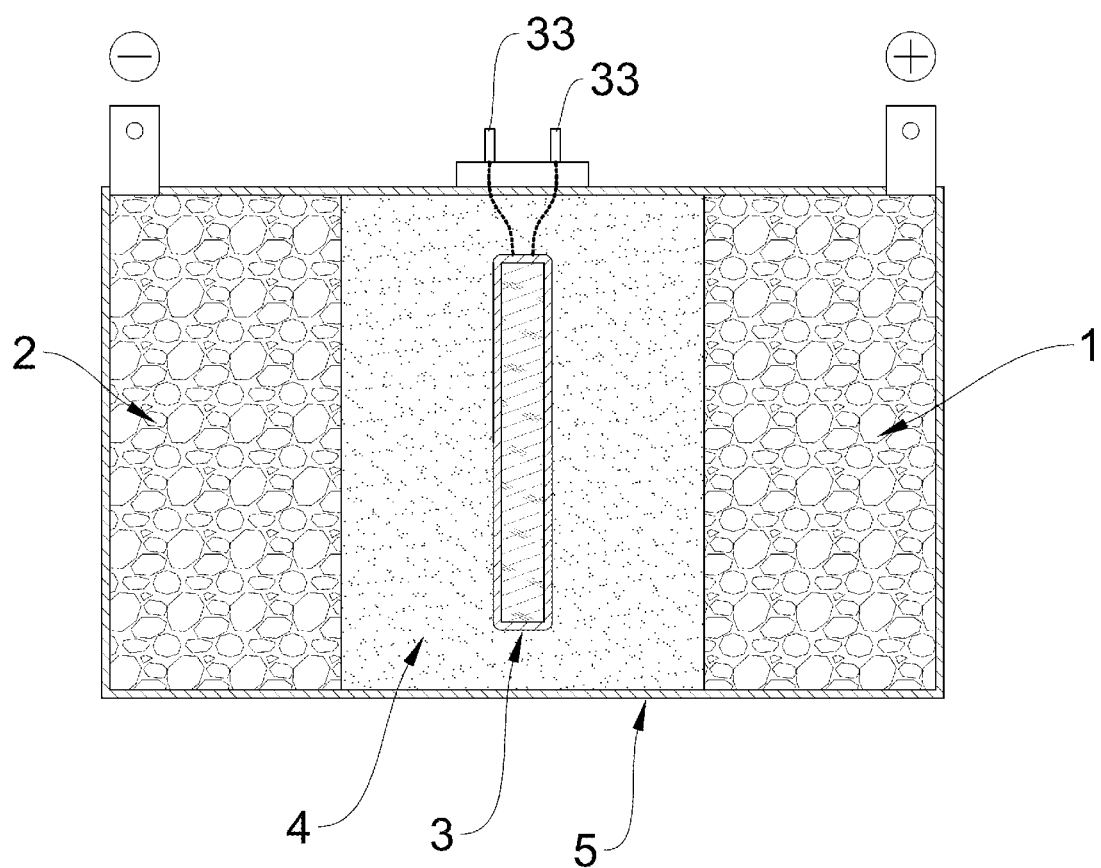
FIG. 1 shows the schematic structural view of the ultrasonic solid-state lithium battery according to embodiment 1 of the present invention.
Figure 2:
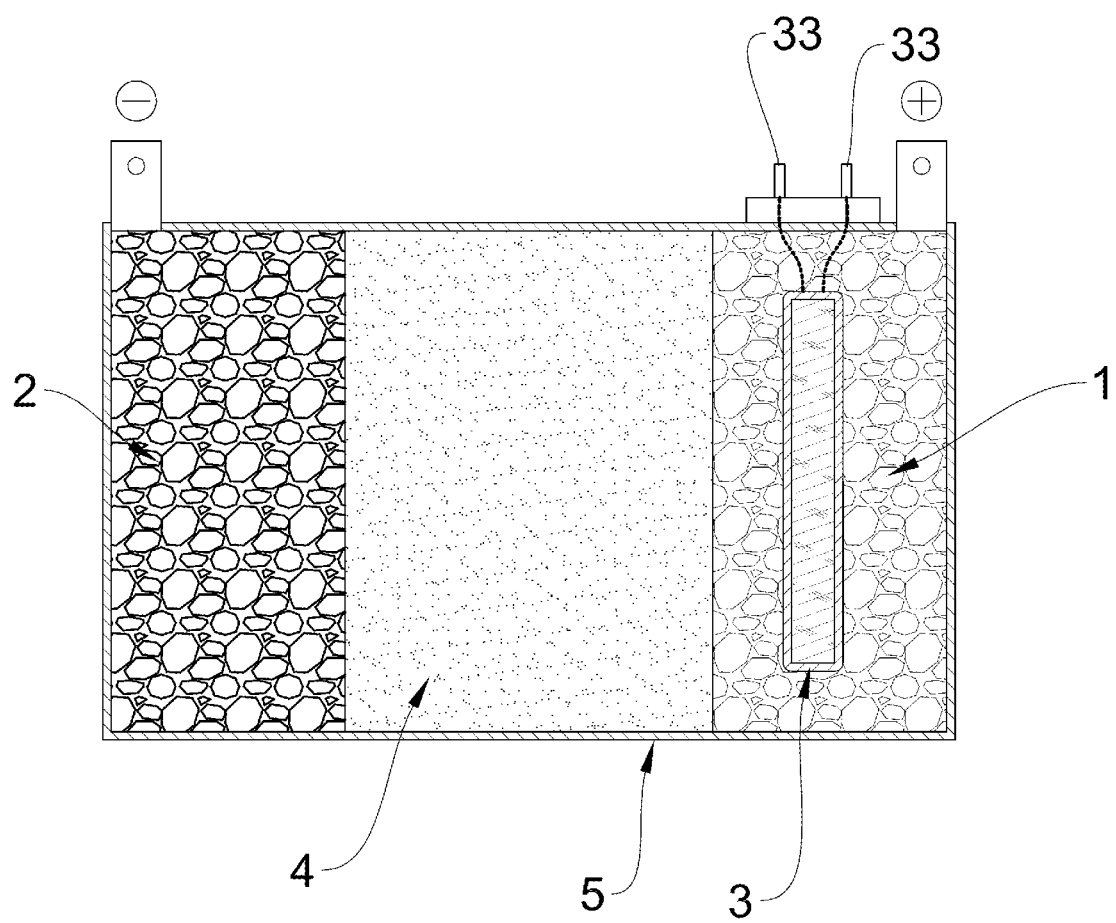
FIG. 2 shows the schematic structural view of the ultrasonic solid-state lithium battery according to embodiment 2 of the present invention.
Figure 3:
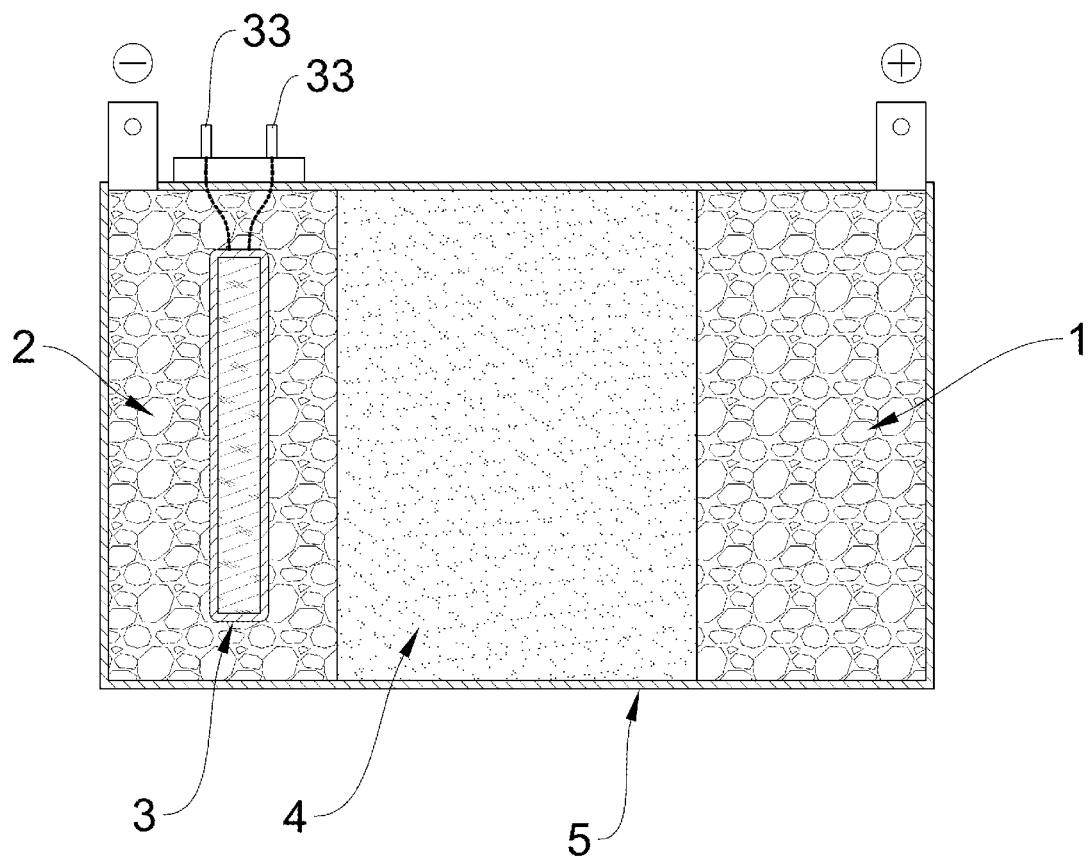
FIG. 3 shows the schematic structural view of the ultrasonic solid-state lithium battery according to embodiment 3 of the present invention.
Figure 4:
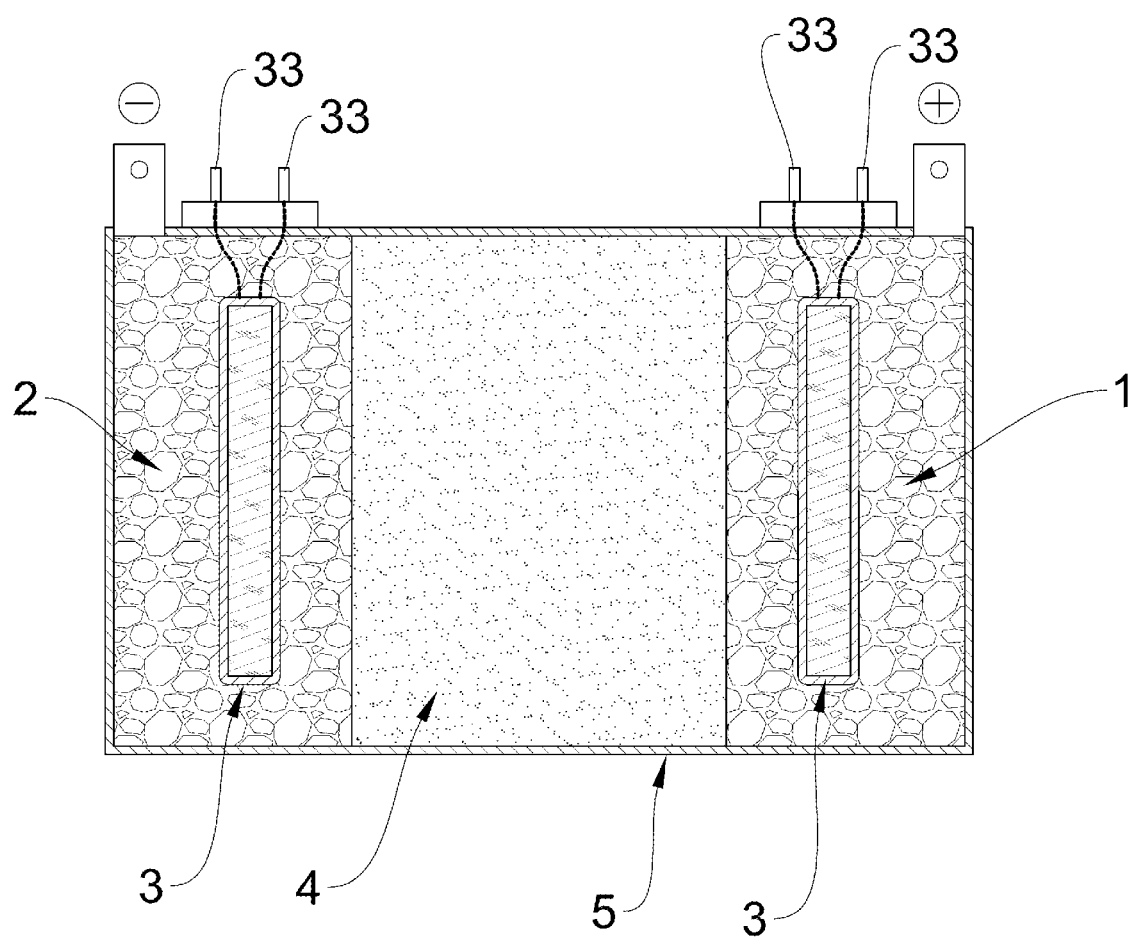
FIG. 4 shows the schematic structural view of the ultrasonic solid-state lithium battery according to embodiment 4 of the present invention.
Figure 5:
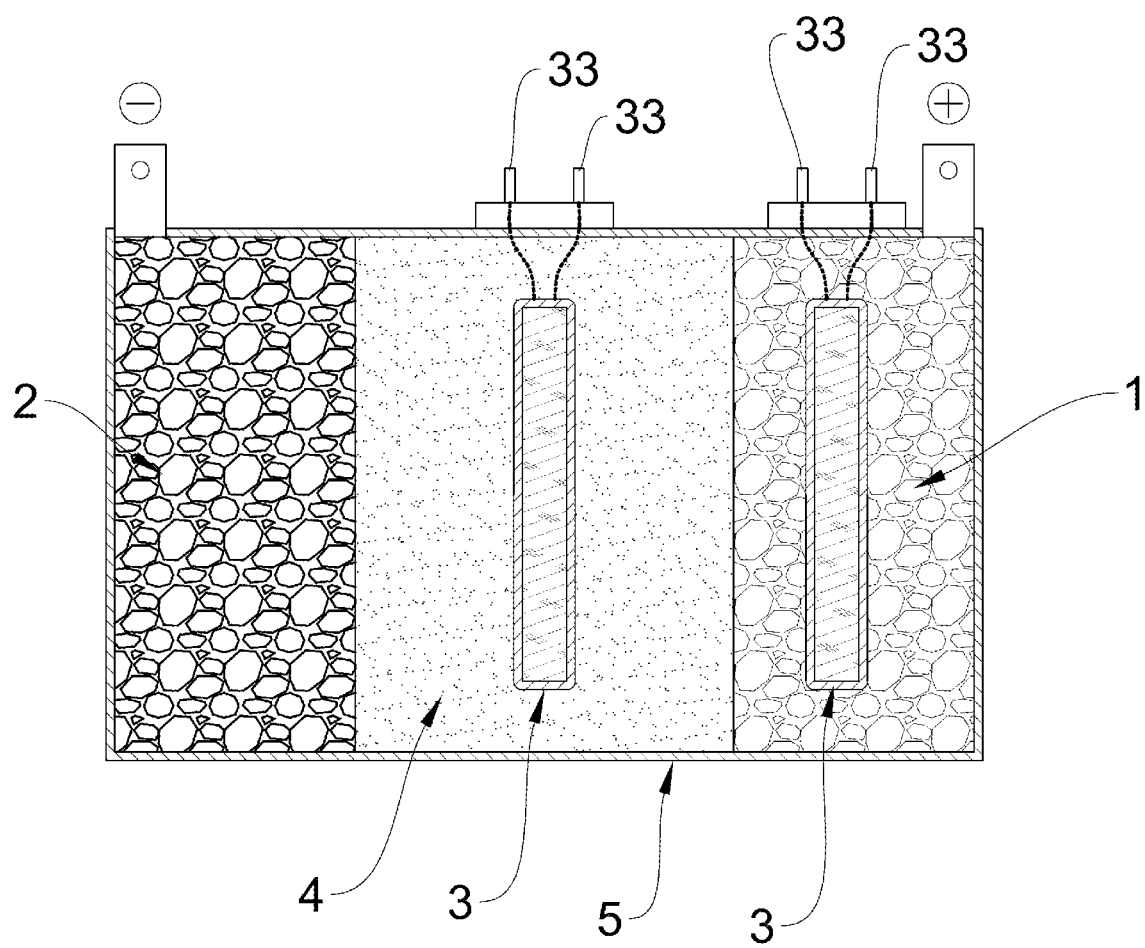
FIG. 5 shows the schematic structural view of the ultrasonic solid-state lithium battery according to embodiment 5 of the present invention.
Figure 6:
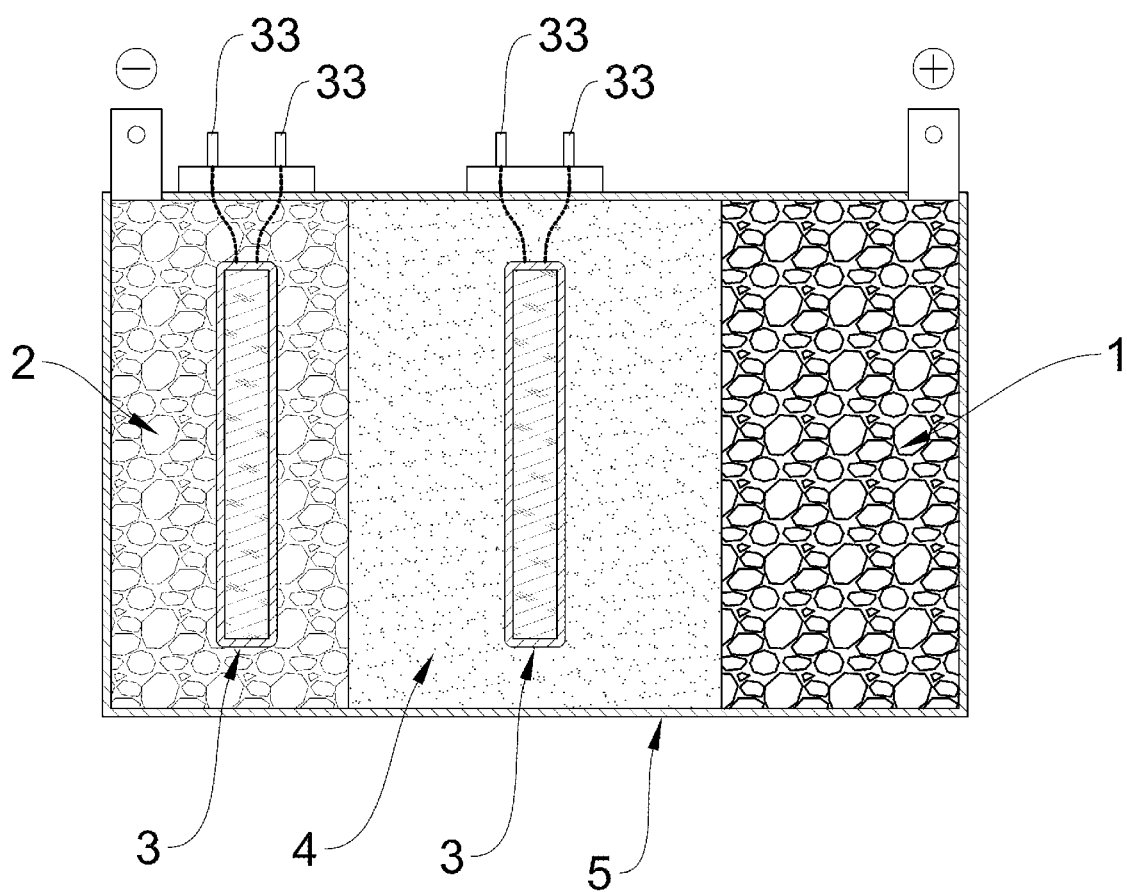
FIG. 6 shows the schematic structural view of the ultrasonic solid-state lithium battery according to embodiment 6 of the present invention.
Figure 7:
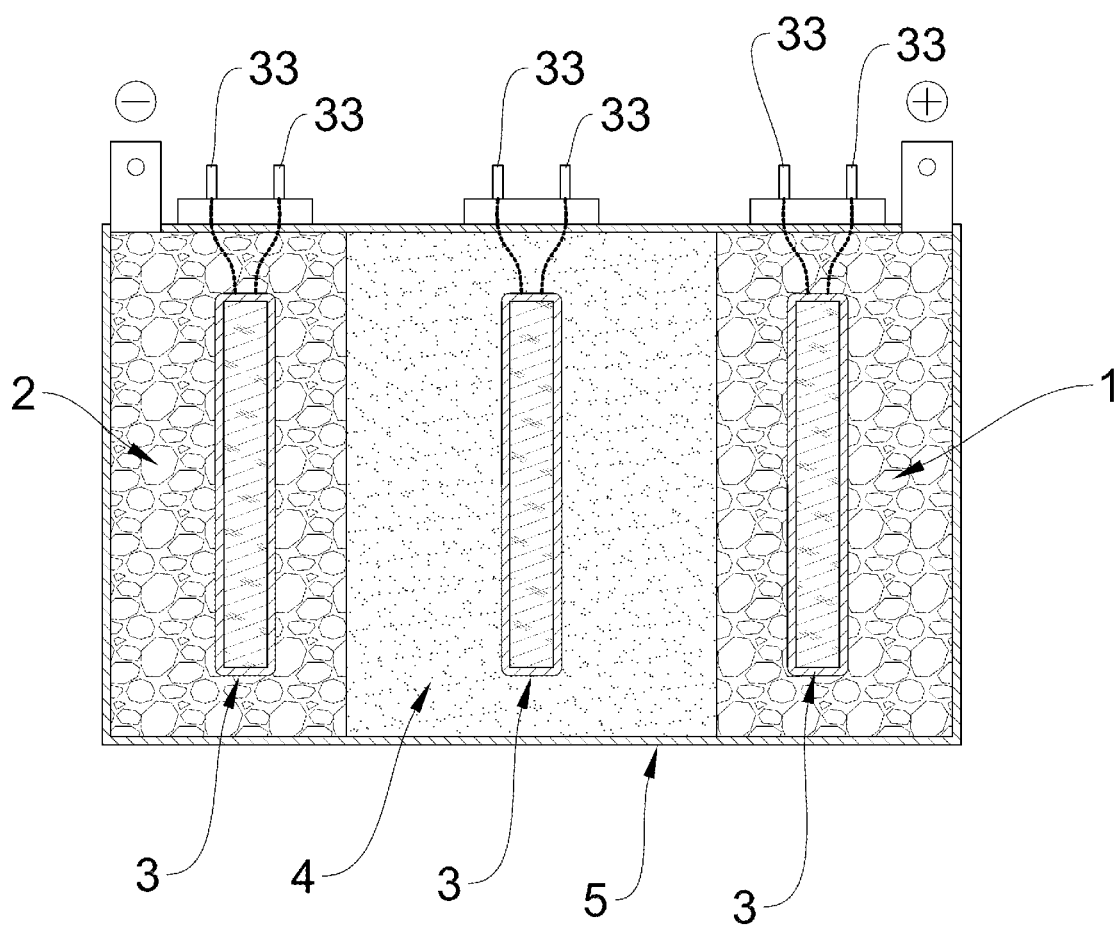
FIG. 7 shows the schematic structural view of the ultrasonic solid-state lithium battery according to embodiment 7 of the present invention.
Figure 8:
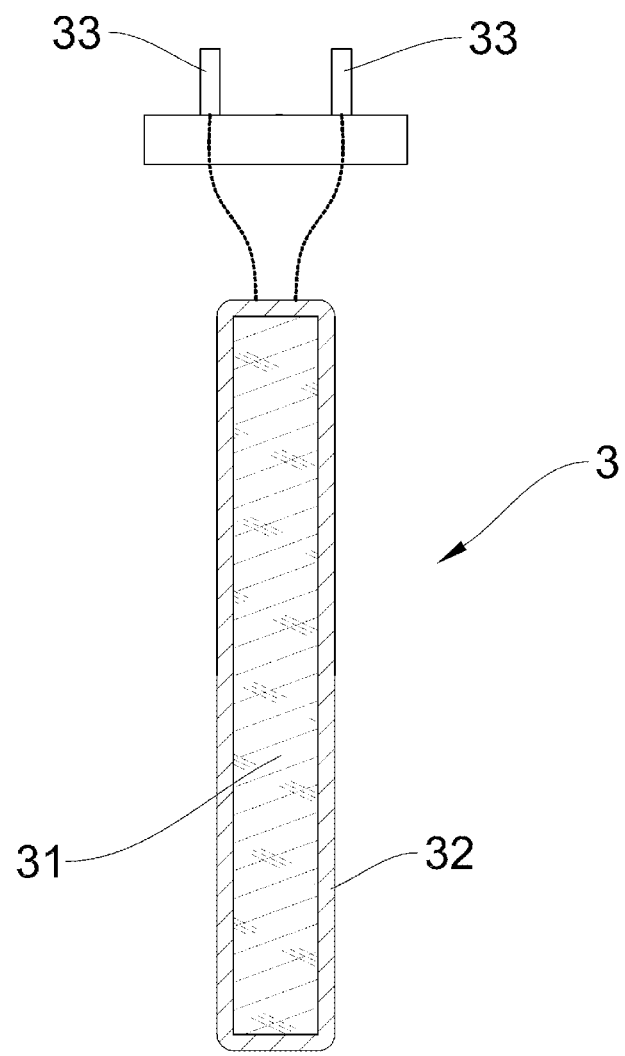
FIG. 8 shows the schematic structural view of the ultrasonic vibrating module of the present invention.

As illustrated in FIGS. 1 to 8, an ultrasonic solid-state lithium battery with built-in ultrasonic vibrating effect, described in the present invention, comprises a battery case 5; a positive electrode 1, a negative electrode 2 and solid electrolyte 4 are installed on the battery case 5. The present invention also comprises an ultrasonic vibrating module 3 built-in within the positive electrode 1 and/or the negative electrode 2 and/or the solid electrolyte 4. The ultrasonic vibrating module 3 comprises an ultrasonic vibrating element 31 and an insulating layer 32 covering on peripheral surfaces of the ultrasonic vibrating element 31. Wiring terminals 33 electrically connected with the ultrasonic vibrating element 31 are provided on or above a top end of the positive electrode 1 and/or negative electrode 2 and/or solid electrolyte 4. As illustrated by FIG. 1 and FIG. 2, the wiring terminals 33 are installed on a top surface of the battery case 5, which is above the top ends of the positive electrode 1, the negative electrode 2 and the solid electrolyte 4. The ultrasonic vibrating element 31 is an ultrasonic energy converter of 1 MHz or above. The ultrasonic vibrating element 31 is an ultrasonic vibrating motor with rotational speed of 10,000 rpm or above.

Base on the aforesaid solution, the present invention, according to actual requirement, may be embodied as illustrated in FIG. 1, which is to install the ultrasonic vibrating module 3 only in the solid electrolyte 4. Or, as illustrated by FIG. 2, the present invention may be embodied to install the ultrasonic vibrating module 3 in each of the solid electrolyte 4, the positive electrode 1 and the negative electrode 2. Other embodiments may be to install the ultrasonic vibrating module 3 only in the positive electrode 1, or only in the negative electrode 2, or in both electrodes, and so on. Therefore, base on the aforesaid solution, there are in total 7 embodiments of installing the ultrasonic vibrating module 3, as represented by the total 7 embodiments illustrated in FIGS. 1-7 respectively.

The above content presents the preferred embodiments of the present invention but does not limit the protection scope thereof. Changes and improvements made by a person skilled in this field of art in accordance with the scope of teachings of the present invention without deviating from the inventive concept of the present invention should also fall within the scope of protection of the present invention.

What is claimed is:

1. An ultrasonic solid-state lithium battery with built-in ultrasonic vibrating effect, comprising a battery case (5); and a positive electrode (1), a negative electrode (2) and solid electrolyte (4) installed on the battery case (5); characterized in that, the ultrasonic solid-state lithium battery also comprises an ultrasonic vibrating module (3) built-in within the positive electrode (1) and/or the negative electrode (2) and/or the solid electrolyte (4); the ultrasonic vibrating module (3) comprises an ultrasonic vibrating element (31) and an insulating layer (32) covering peripheral surfaces of the ultrasonic vibrating element (31); wiring terminals (33) electrically connected with the ultrasonic vibrating element (31) are provided on or above a top end of the positive electrode (1) and/or the negative electrode (2) and/or the solid electrolyte (4).

2. The ultrasonic solid-state lithium battery with built-in ultrasonic vibrating effect as in claim 1, characterized in that: the ultrasonic vibrating element (31) is an ultrasonic energy converter of 1 MHz or above.

3. The ultrasonic solid-state lithium battery with built-in ultrasonic vibrating effect as in claim 1, characterized in that: the ultrasonic vibrating element is an ultrasonic vibrating motor with a rotational speed of 10,000 rpm or above.

* * * * *